US 9,725,048 B2

(12) United States Patent
Heinemann

(10) Patent No.: US 9,725,048 B2
(45) Date of Patent: Aug. 8, 2017

(54) MOTOR VEHICLE COMPRISING AN ELECTRONIC REAR-VIEW MIRROR

(71) Applicant: AUDI AG, Ingolstadt (DE)

(72) Inventor: Patrick Heinemann, Koesching (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 14/383,263

(22) PCT Filed: Jan. 16, 2013

(86) PCT No.: PCT/EP2013/000113
§ 371 (c)(1),
(2) Date: Sep. 5, 2014

(87) PCT Pub. No.: WO2013/131598
PCT Pub. Date: Sep. 12, 2013

(65) Prior Publication Data
US 2015/0085120 A1    Mar. 26, 2015

(30) Foreign Application Priority Data
Mar. 7, 2012 (DE) .................. 10 2012 004 639

(51) Int. Cl.
B60R 11/04 (2006.01)
B60R 1/12 (2006.01)
(Continued)

(52) U.S. Cl.
CPC ............ B60R 11/04 (2013.01); B60R 1/00 (2013.01); B60R 1/062 (2013.01); B60R 1/0612 (2013.01);
(Continued)

(58) Field of Classification Search
CPC ......... B60R 1/0612; B60R 1/00; B60R 11/04; B60R 11/0229; B60R 1/12; B60R 1/062;
(Continued)

(56) References Cited

U.S. PATENT DOCUMENTS 5,027,200 A * 6/1991 Petrossian et al. ........... 348/118
5,303,205 A * 4/1994 Gauthier et al. .............. 367/108
(Continued)

FOREIGN PATENT DOCUMENTS

| CN | 101522470 | 9/2009 |
| CN | 201849414 | 6/2011 |

(Continued)

OTHER PUBLICATIONS

English Translation of the International Preliminary Report on Patentability mailed Sep. 12, 2014 for corresponding International Patent Application No. PCT/EP2013/000113.
(Continued)

Primary Examiner — Mohammed Jebari
(74) Attorney, Agent, or Firm — Staas & Halsey LLP

(57) ABSTRACT

A motor vehicle has at least one electronic rearview mirror, particularly an exterior and/or side mirror, that has a display apparatus, particularly a display, for images recorded by an exterior camera that is provided particularly outside the motor vehicle. The operator control element provided for adjusting an image detail from the image, which image detail is to be displayed on the display apparatus, and/or an orientation for the exterior camera is a mirror operator control element, developed for the purpose of adjusting a mirror face of a conventional exterior mirror, and/or a rotary/push control of a man/machine interface.

17 Claims, 3 Drawing Sheets

(51) Int. Cl.
  *B60R 1/06* (2006.01)
  *B60R 1/00* (2006.01)
  *B60R 1/062* (2006.01)
  *B60R 11/02* (2006.01)
  *B60R 11/00* (2006.01)

(52) U.S. Cl.
  CPC ............ *B60R 1/12* (2013.01); *B60R 11/0229* (2013.01); *B60R 2001/1215* (2013.01); *B60R 2011/004* (2013.01); *B60R 2011/008* (2013.01); *B60R 2300/101* (2013.01); *B60R 2300/8026* (2013.01); *B60R 2300/8046* (2013.01)

(58) Field of Classification Search
  CPC ...... B60R 2300/8046; B60R 2300/101; B60R 2011/008; B60R 2011/004; B60R 2300/8026; B60R 2001/1215; B60R 2300/802; B60R 2300/806; B60R 2300/804
  See application file for complete search history.

(56) References Cited

U.S. PATENT DOCUMENTS

| | | | |
|---|---|---|---|
| 5,642,238 A * | 6/1997 | Sala | 359/871 |
| 6,447,128 B1 | 9/2002 | Lang et al. | |
| 6,657,316 B1 | 12/2003 | Smith et al. | |
| 8,988,250 B2 * | 3/2015 | Suzuki et al. | 340/932.2 |
| 2002/0003571 A1 * | 1/2002 | Schofield et al. | 348/148 |
| 2002/0080018 A1 * | 6/2002 | Yamazaki | 340/436 |
| 2002/0141086 A1 | 10/2002 | Lang et al. | |
| 2002/0186201 A1 * | 12/2002 | Gutta et al. | 345/156 |
| 2003/0191569 A1 | 10/2003 | Su et al. | |
| 2004/0196368 A1 | 10/2004 | Asai | |
| 2004/0212676 A1 | 10/2004 | Mathes et al. | |
| 2005/0146604 A1 * | 7/2005 | Shinada | 348/118 |
| 2006/0290482 A1 * | 12/2006 | Matsumoto et al. | 340/436 |
| 2008/0055411 A1 * | 3/2008 | Lee | 348/148 |
| 2008/0100939 A1 * | 5/2008 | Brester | 359/872 |
| 2010/0225762 A1 | 9/2010 | Augst | |
| 2012/0133768 A1 * | 5/2012 | Stephan | 348/148 |
| 2012/0314075 A1 * | 12/2012 | Cho | 348/148 |
| 2014/0285666 A1 * | 9/2014 | O'Connell et al. | 348/148 |

FOREIGN PATENT DOCUMENTS

| | | |
|---|---|---|
| DE | 42 13 133 C1 | 10/1993 |
| DE | 198 16 054 A1 | 10/1998 |
| DE | 198 01 884 A1 | 7/1999 |
| DE | 100 31 590 A1 | 1/2002 |
| DE | 100 36 875 A1 | 2/2002 |
| DE | 103 15 032 A1 | 12/2003 |
| DE | 103 21 228 A1 | 11/2004 |
| DE | 60 2004 000 387 T2 | 10/2006 |
| DE | 10 2007 044 535 A1 | 3/2009 |
| DE | 10 2007 044 536 | 3/2009 |
| DE | 10 2012 004 639.1 | 3/2012 |
| DE | 10 2011 118 253 A1 | 5/2013 |
| FR | 2 913 798 A1 | 9/2008 |
| WO | WO 99/37503 A1 | 7/1999 |
| WO | WO 2008/138491 | 11/2008 |
| WO | WO 2009/044654 A1 | 4/2009 |
| WO | WO 2011/014903 A1 | 2/2011 |
| WO | PCT/EP2013/000113 | 1/2013 |

OTHER PUBLICATIONS

Office Action issued Oct. 4, 2012 for corresponding German Patent Application No. 10 2012 004 639.1.
International Search Report mailed Apr. 10, 2013 for corresponding International Patent Application No. PCT/EP2013/000113.
European Office Action dated Oct. 14, 2015 from European Patent Application No. 13705095.1, 5 pages.
Chinese Office Action dated Sep. 28, 2015 from Chinese Patent Application No. 201380010828.9, 8 pages.
European Examination Report dated May 2, 2016 from European Patent Application No. 13705095.1, 3 pages.
Chinese Office Action dated May 16, 2016 from Chinese Patent Application No. 201380010828.9, 8 pages.
Chinese Office Action dated Nov. 8, 2016 from Chinese Patent Application No. 201380010828.9, 3 pages.

* cited by examiner

MOTOR VEHICLE COMPRISING AN ELECTRONIC REAR-VIEW MIRROR

CROSS REFERENCE TO RELATED APPLICATIONS

This application is based on and hereby claims priority to International Application No. PCT/EP2013/000113 filed on Jan. 16, 2013 and German Application No. 10 2012 004 639.1filed on Mar. 7, 2012, the contents of which are hereby incorporated by reference.

BACKGROUND

The invention relates to a motor vehicle comprising at least one electronic rearview mirror, particularly an exterior and/or side mirror, that has a display apparatus, particularly a display, for images recorded by an exterior camera that is provided particularly outside the motor vehicle.

The related art has already proposed electronic rearview mirrors, in particular electronic exterior mirrors and/or side mirrors. In the case of this type of exterior mirror, a virtual mirror is provided, that is to say that instead of a mirror face a display apparatus, particularly a display, is used that presents data that are recorded by an exterior camera that is arranged particularly in the exterior mirror itself. However, embodiments are also known in which the display apparatus is arranged in the interior of the motor vehicle, for example in the region of the A pillar. In this case, general systems are known in which a firmly defined (camera) viewing angle is provided for the image presented on the display apparatus.

However, systems have now also been proposed that allow the camera to be adjusted, for example. This involves the use of a swivel device that allows inclination or angle tracking of the camera system in order to replace mirror readjustment.

In addition, the subsequently published patent application DE 10 2011 118 253.9 from the applicant has proposed that the camera records a relatively large region and only an image detail—which can be adjusted by a user and/or automatically—from an image recorded by the exterior camera is presented on the display apparatus. The latter thus displays an image detail from the larger camera image, said image detail being able to be selected by the user or on the basis of the situation.

Both swiveling of the camera and selection of an image detail can thus provide a driver with the opportunity to alter the viewing angle presented in the mirror, whether by the mechanical swiveling of the camera or by the selection of a particular image detail. Automatic adjustment of the viewing angle has also already been proposed, with an automatic change possibly being rather undesirable in some situations. These situations require driver interaction.

SUMMARY

One possible object therefore relates to specifying a specific, advantageous way, that is easy for the driver to understand, of adjusting an image detail and/or an orientation for the exterior camera.

The inventor proposes a motor vehicle comprising at least one electronic rearview mirror, particularly an exterior and/or side mirror, that has a display apparatus, particularly a display, for images recorded by an exterior camera that is provided particularly outside the motor vehicle. According to the proposal, an operator control element is provided for adjusting an image detail from the image, which image detail is to be displayed on the display apparatus, and/or an orientation for the exterior camera to be a mirror operator control element. The operator control element is one developed for the purpose of adjusting the mirror face of a conventional exterior mirror, and/or a rotary/push control of a man/machine interface.

In a first option according to the proposal, provision may thus be made for the use of a conventional mirror operator control element, which is usually used for adjusting a mirror face in the case of a conventional exterior mirror, from an electronic mirror too. By way of example, this may involve fundamentally known mirror adjusting knobs that, in the case of motor vehicles having a conventional exterior mirror that has a mirror face, allow the orientation of the mirror face and consequently of the region that can be viewed in the exterior mirror to be changed by swiveling the mirror face per se and/or the entire exterior mirror. Thus, if a mirror operator control element that has already been used earlier for adjustment on an exterior mirror that is still conventional in that case is used, there is a simple and hence safe and distraction-free interaction option for the driver that, furthermore, also still corresponds to the accustomed adjustment of the conventional mirror.

In another, additionally or alternatively provided option, it is proposed that a rotary/push control of a man/machine interface be used for the adjustment. Such rotary/push controls are already widely known in the related art and are frequently used together with a display, for example in order to select menu items and to make adjustments. They have a degree of rotary freedom and a degree of push freedom, that is to say combine a dial with a button, for example. The proposal now also aims to use a rotary/push control of this kind to make adjustments to an electronic rearview mirror, for example to an exterior mirror or a central interior rearview mirror. To this end, provision may be made, by way of example, for the man/machine interface initially to be used to select the mirror as the element to be adjusted, with the specific adjustment then being made by the rotary/push control. The user thus finds the option for adjusting his electronic rearview mirror at a location and in a manner that are already known to him from other adjustments, so that in this case too a particularly simple and convenient option is provided for making the adjustment.

In a further embodiment, there may be provision that in the case of two exterior and/or side mirrors that are in the form of electronic rearview mirrors each one has an associated mirror operator control element or one mirror operator control element is provided for both exterior and/or side mirrors, wherein a mirror can be selected particularly by rotating the mirror operator control element into a latch position associated with an exterior and/or side mirror. Such mirror operator control elements, also known as a mirror adjusting knob, have already been proposed in the related art for conventional mirrors in order to adjust the mirror face in a suitable manner. Such a mirror operator control element can have latch positions, which can dialed in by rotation, for each electronic rearview mirror that it can be used to adjust, and additionally a neutral position can be provided, so that no adjustment is made if the mirror operator control element is touched inadvertently. Therefore, in the neutral latch position, no mirror is dialed in. If electronic exterior and/or side mirrors are being adjusted, a central neutral latch position may be surrounded by latch positions for the left and right mirrors, for example. When a latch position associated with a rear view mirror has been dialed in, provision may be made, by way of example, for the mirror operator control element to be able to be moved in two degrees of freedom of linear movement that are perpendicular to one another, in particular, so that appropriate tilting of the exterior camera or displacement of the image detail can be dialed in.

The proposal may also have general provision for the mirror operator control element to have two degrees of freedom of linear movement that are perpendicular to one another, in particular, and that are associated with tilting of the exterior camera and/or displacement of the image detail in a respective corresponding direction. In this case, a direction running essentially in the longitudinal direction of the vehicle is ideally associated with displacement of the image detail upward and downward or with tilting of the camera about a horizontal axis, whereas a direction corresponding essentially to the transverse direction of the vehicle is associated with left/right displacement of the image detail or with tilting of the camera about a vertical axis.

There are also several options for the specific embodiment of the rotary/push control. Thus, provision may be made for the rotary/push control to have an adjusting element that can move in at least two directions of movement, that is arranged centrally, in particular, on the rotary/push control and the directions of movement of which are associated with at least one corresponding direction for tilting the exterior camera and/or displacing the image detail. In this case, it is conceivable, by way of example, for the adjusting element to be in the form of a joystick or movable knob or trackball. Provision may thus be made for a further operator control element, particularly a joystick, a movable knob or a trackball, to be integrated on the rotary/push control for the purpose of providing further degrees of freedom. This particularly allows the degree of rotary freedom of the rotary/push control to be assigned to a further functionality, particularly to a zoom, which will be discussed in even more detail below.

As an alternative to a movable adjusting element, provision may also be made for a touchpad to be provided on the rotary/push control as a further adjusting element, wherein sensed directions of movement on the touchpad are associated with at least one corresponding direction for tilting the exterior camera and/or displacing the image detail. By way of example, it is thus possible for at least part of an upper surface of the rotary/push control to be in the form of a touchpad, so that, by stroking a finger thereover in a particular direction, for example, it is possible to prescribe a direction in which an image detail is then also displaced and/or the camera is tilted.

The manners thus described allow the adjustment possibilities of the rotary/push control to be extended given a compact overall design.

At this juncture, however, it should be noted in this context that it is naturally also conceivable, in principle, for just the rotary/push control to be used to make appropriate adjustments for the orientation of the exterior camera or the image detail. By way of example, a direction in which the tilting or displacement is intended to take place can be selected via the man/machine interface, particularly by a presented menu, and then a corresponding displacement in the direction can be brought about by rotating the rotary/push control. It is preferable, however, for the rotary/push control to be extended by an adjusting element.

The reason is that, in this case, it is particularly advantageously possible for a magnification level for the camera and/or the image detail to be able to be selected by rotating the rotary/push control. The additional option of enlarging or reducing the image detail or of adjusting a magnification level for the camera (zooming) therefore provides a further degree of freedom that the driver can use to view particular image contents more accurately, for example the wheel rims as a result of magnification during parking. It is also conceivable for him to "zoom out", as it were, in order to obtain a better overview by enlarging the field of vision. Advantageously, such operator control is simple for a user to learn, since such control is already known to him from navigation, for example, where map details can be displaced and zoomed by using the rotary/push control.

In a further embodiment, provision may be made for one of a plurality of electronic rearview mirrors to be able to be selected via the man/machine interface, particularly by the rotary/push control. If a plurality of electronic rearview mirrors are provided, therefore, it is possible for an electronic rearview mirror for adjustment to be selected via the man/machine interface, for which purpose the rotary/push control is also used with particular advantage. It is thus possible for the rotary/push control to be used for selecting and adjusting a plurality of electronic rearview mirrors.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
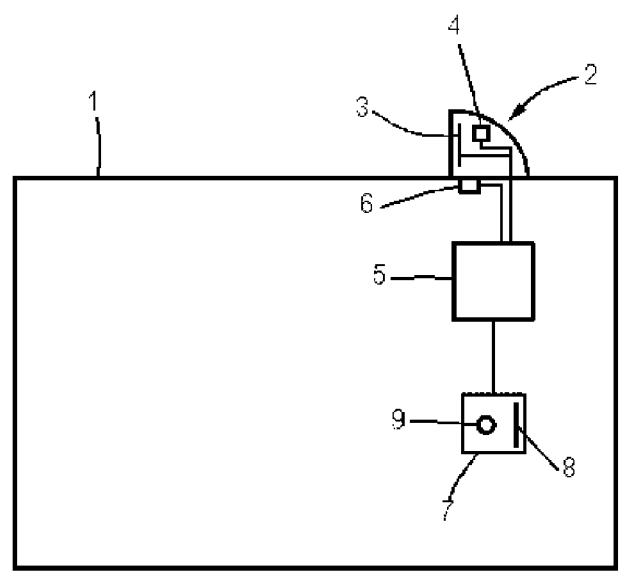
FIG. 1 shows a basic outline of a proposed motor vehicle.

Reference will now be made in detail to the preferred embodiments of the present invention, examples of which are illustrated in the accompanying drawings, wherein like reference numerals refer to like elements throughout.

FIG. 1 shows a basic outline of a proposed motor vehicle 1. The motor vehicle 1 comprises an electronic rearview mirror 2, in this case an electronic exterior mirror or side mirror, it naturally also being possible for a second electronic exterior mirror 2 to be provided on the other side of the motor vehicle 1. Instead of a mirror face, the exterior mirror 2 comprises a display apparatus 3, in this case a display. Provided next to or above the display apparatus 3, likewise integrated in the exterior mirror 2, is an exterior camera 4 that has a capture region that is directed against the direction of travel and covers a portion of the vehicle surroundings, said exterior camera being equipped with a wide angle lens in the present case in order to record the widest possible regions of the vehicle surroundings. The operation of the electronic rearview mirror 2 is controlled by a controller 5.

In this case, in the present exemplary embodiment, provision is made for just an image detail from an overall image recorded by the exterior camera 4 to be presented on the display apparatus 3. In the present case, the exterior camera 4, which can otherwise also be in the form of an infrared camera, comprises a wide angle lens in order to be able to record the largest possible region of the vehicle surroundings at the sides of and behind the motor vehicle 1. Specifically which image detail is displayed can be adjusted by the driver himself using a mirror operator control element 6 or on a man/machine interface 7, which in the present case comprises a display 8 and a rotary/push control 9.

In this case, it is already noted at this juncture that other embodiments of a motor vehicle 1 are also conceivable in principle, for example in respect of a display apparatus 3 arranged inside the motor vehicle, an interior rearview mirror that is additionally existent as an electronic rearview mirror and a swivelable embodiment of the exterior camera 4. In this case, however, a displaceable image detail, as has been described, is preferred over a swivelable camera.

The mirror operator control element 6 is a mirror operator control element that has been developed and already used for tilting mirror faces in conventional mirrors, which means that the driver does not need to readjust in this case. In addition, the mirror operator control element 6 is arranged at a location at which the driver is accustomed to finding it, in the present exemplary embodiment in the region of the driver's door.

Figure 2:
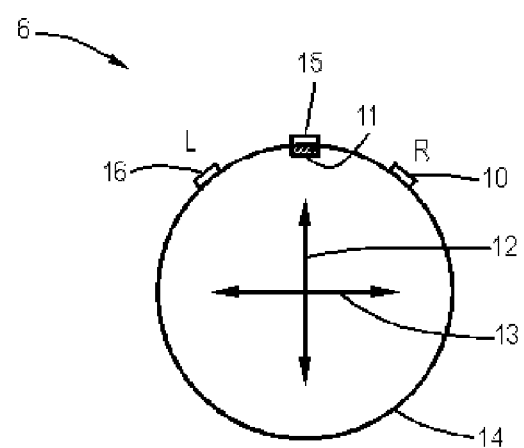
FIG. 2 shows a possible embodiment of a mirror operator control element.

FIG. 2 shows a possible embodiment of such a mirror operator control element in more detail, said mirror operator control element being designed in the present case for adjusting two electronic rearview mirrors 2, in this case a left and a right exterior mirror. To this end, the mirror operator control element 6, cf. FIG. 2, first of all has a rotatable knob 14 that can be put into three different latch positions by rotation. A basic position, also called neutral latch position 15, is arranged centrally and is not associated with an electronic exterior mirror.

Arranged around the neutral latch position 15 are two further latch positions 16, 10, the latch position 16 being associated with the left electronic rearview mirror 2 and the latch position 10 being associated with the right electronic rearview mirror 2. A marker 11 on the knob 14 indicates the current latch position to the driver.

Besides its rotatability, the knob 14 also has further degrees of freedom of movement, predominantly mobility in two directions perpendicular to one another, arrow 12 and arrow 13. If a latch position 16, 10 associated with an electronic rearview mirror 2 has been adopted, moving the knob 14 in one of the directions results in the image detail being displaced in an associated direction. In this case, the direction described by arrow 12 (front-back) is associated with displacement of the image detail in the "top-bottom" direction, and deflection in the direction indicated by arrow 13 (left-right) results in displacement of the image detail to the left or right.

Such operator control is known to the driver from conventional mirrors that have a mirror face, in order to change the orientation of the mirror face, which means that it is intuitive and simple to learn.

However, it is also possible for the image detail to be adjusted using the rotary/push control 9 of the man/machine interface. In this case, in all of the exemplary embodiments shown here, the rotary/push control 9 has an adjusting element that has further degrees of freedom, in this case two degrees of freedom of movement in directions perpendicular to one another, which means that it is possible to use the degree of rotary freedom of the rotary/push control 9 to alter a magnification level for the image detail, and therefore for a zoom function.

FIGS. 3-6 now show various embodiments of such a rotary/push control 9 with an additional adjusting element 17.

Figure 3:
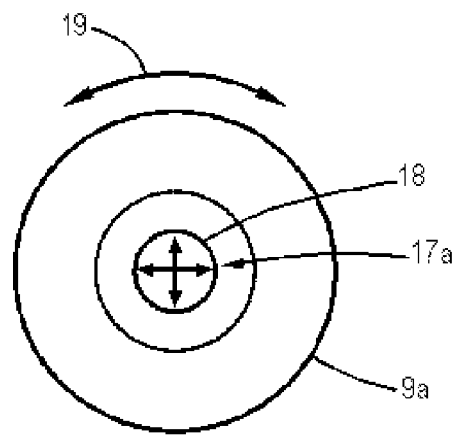
FIG. 3 shows a first possible embodiment of a rotary/push control.

FIG. 3 shows a rotary/push control 9*a* on which a joystick 18 is arranged centrally as adjusting element 17*a*. As indicated, this can be deflected in two directions perpendicular to one another in order to allow the image detail to be displaced. Following selection of an electronic rearview mirror 2 in a menu, said joystick can therefore be used to displace the image detail in the camera image from the exterior camera 4. At the same time, it is possible to select the zoom level (magnification level) by rotating the rotary/push control 9*a*, arrow 19. This otherwise also applies to the rotary/push controls 9*b*, 9*c* and 9*d* that will now also be discussed.

Figure 4:
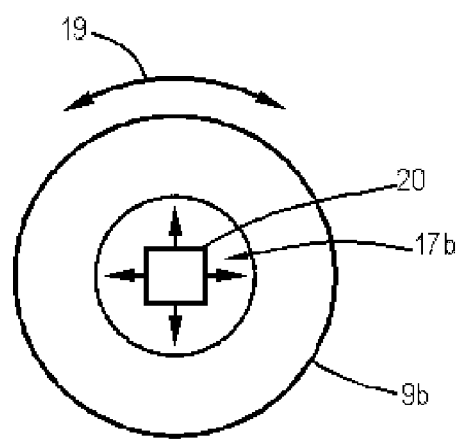
FIG. 4 shows a second possible embodiment of a rotary/push control.

In the rotary/push control 9*b* shown in FIG. 4, a knob 20 that can likewise be moved in two directions perpendicular to one another is provided centrally as adjusting element 17*b*. In this case too, the directions are associated with directions of displacement for the image detail.

Figure 5:
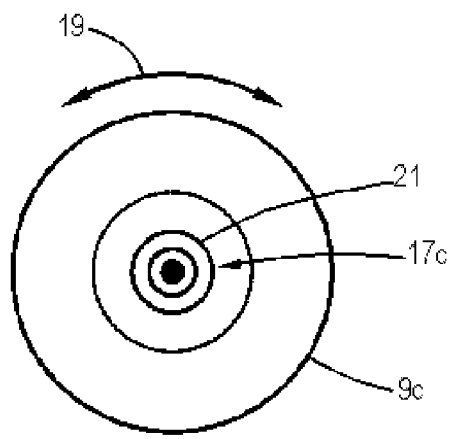
FIG. 5 shows a third possible embodiment of a rotary/push control.

FIG. 5 shows a further embodiment of a rotary/push control 9*c*, in which a trackball 21 is integrated in the center of the rotary/push control 9*c* as adjusting element 17*c*. This is known to be able to be rotated in various directions that are then mapped to directions in the image from the exterior camera 4 as appropriate, so that the image detail can be displaced.

Figure 6:
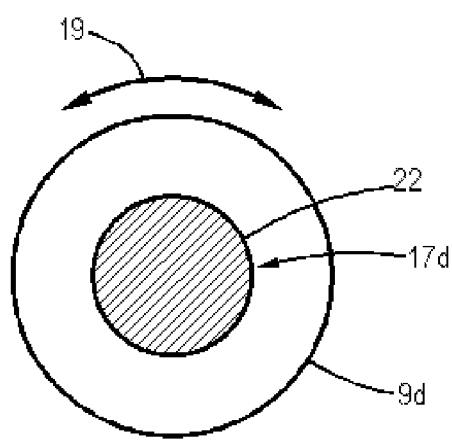
FIG. 6 shows a fourth possible embodiment of a rotary/push control.

Finally, FIG. 6 shows an embodiment of a rotary/push control 9*d* that is provided with a touchpad 22 centrally as adjusting element 17*d*. Movements by a finger of the driver over the touchpad 22 are detected and accordingly associated with a direction that is associated with a direction for the displacement of the image detail, as a result of which it is also possible to use the touchpad 22 to adjust the position of the image detail.

These embodiments naturally all apply in similar fashion to the case in which there is provision for the exterior camera 4 to be swiveled.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A motor vehicle comprising:
   an exterior camera that is provided outside the motor vehicle to record an image field;
   an electronic side rearview simulated mirror, that has a display apparatus to display images recorded by the exterior camera;
   an operator control element to change an orientation of the exterior camera and to select an image detail for display, the image detail being selected from the image field recorded by the exterior camera, the operator control element being a mirror operator control element for a mirror face of a conventional exterior mirror; and
   a man/machine interface separately disposed within the motor vehicle from the operator control element, the man/machine interface comprising a rotary/push control device which includes:
   a rotary control portion that when rotated, adjusts a magnification level for the exterior camera and/or for the image detail, and an adjusting element provided centrally on the rotary/push control portion and movable in at least two directions of movement to select a direction to displace the image detail, wherein the operator control element is movable in at least two directions of movement that are perpendicular to one another to control tilting of the exterior camera in two perpendicular directions and/or to control displacement of the image detail in two perpendicular directions, and the operator control element changes the orientation of the exterior camera by controlling the exterior camera to swivel independent of movement of the electronic side rearview simulated mirror.

2. The motor vehicle according to claim 1, wherein there are first and second side rearview simulated mirrors, both side rearview simulated mirrors can be operated by the operator control element, the operator control element is rotatable and has at least first and second latch positions, when the operator control element is rotated into the first latch position, the first side rearview simulated mirror is selected and controlled by the operator control element, and when the operator control element is rotated into the second latch position, the second side rearview simulated mirror is selected and controlled by the operator control element.

3. The motor vehicle as claimed in claim 2, wherein a single operator control element is provided for both side rearview simulated mirrors.

4. The motor vehicle as claimed in claim 2, wherein first and second operator control elements are provided respectively for the first and second side rearview simulated mirrors, and each operator control element can operate both side rearview simulated mirrors.

5. The motor vehicle as claimed in claim 1, wherein the side rearview simulated mirror is an interior side mirror provided on an A-pillar of the motor vehicle.

6. The motor vehicle as claimed in claim 1, wherein a single camera is used to record the images displayed by the display apparatus.

7. The motor vehicle according to claim 1, wherein the directions of movement of the adjusting element are associated with corresponding directions for tilting the exterior camera and displacing the image detail.

8. The motor vehicle according to claim 1, wherein the adjusting element is a joystick or a movable knob or a trackball.

9. The motor vehicle according to claim 1, wherein the adjusting element corresponds to a touchpad, and a sensed direction of movement on the touchpad is associated with a corresponding direction for tilting the exterior camera and displacing the image detail.

10. The motor vehicle according to claim 1, wherein there are first and second side rearview simulated mirrors, both side rearview simulated mirrors are operable by the operator control element and via the man/machine interface comprising the rotary/push control device, and one of the first and second side rearview simulated mirrors is selectable for control by at least one of the operator control element and the man/machine interface comprising the rotary/push control device.

11. The motor vehicle as claimed in claim 1, wherein the rotary control portion comprises a rotatable exterior ring to adjust the magnification level for the exterior camera and/or the image detail, and the adjusting element corresponds to a located joystick provided centrally within the rotatable exterior ring, the joystick being movable in directions that are mapped to directions for tilting the exterior mirror and displacing the image detail.

12. The motor vehicle as claimed in claim 1, wherein the rotary control portion comprises a rotatable exterior ring to adjust the magnification level for the exterior camera and/or the image detail, and the adjusting element corresponds to a movable knob provided centrally within the rotatable exterior ring, the movable knob being movable in directions that are mapped to directions for tilting the exterior mirror and displacing the image detail.

13. The motor vehicle as claimed in claim 1, wherein the rotary control portion comprises a rotatable exterior ring to adjust the magnification level for the exterior camera and/or the image detail, and the adjusting element corresponds to a trackball provided centrally within the rotatable exterior ring, the trackball being movable in directions that are mapped to directions for tilting the exterior mirror and displacing the image detail.

14. The motor vehicle as claimed in claim 1, wherein there are first and second side rearview simulated mirrors, both side rearview simulated mirrors are operable by the operator control element and the man/machine interface comprising the rotary/push control device, one of the first and second side rearview simulated mirrors is selected for control by at least one of the operator control element and the man/machine interface comprising the rotary/push control device, the rotary control portion comprises a rotatable exterior ring to adjust the magnification level for the exterior camera and/or the image detail, and the adjusting element is provided centrally within the rotatable exterior ring, the adjusting element being movable in directions that are mapped to directions for tilting the exterior mirror and displacing the image detail.

15. A motor vehicle comprising:

a door;

an exterior camera that is provided outside the motor vehicle to record an image field;

an electronic side rearview simulated mirror, that has a display apparatus to display images recorded by the exterior camera;

a first operator control element to change an orientation of the exterior camera and to select an image detail for display, the image detail being selected from the image field recorded by the exterior camera, the first operator control element being a rotary/push control device of a man/machine interface and including:

a rotary control portion that when rotated, adjusts a magnification level for the exterior camera and/or for the image detail, and an adjusting element provided on the rotary/push control portion and movable in at least two directions of movement to select a direction to displace the image detail; and a second operator control element to change the orientation of the exterior camera and to select the image detail for display, the image detail being selected from the image field recorded by the exterior camera, the second operator control element being a mirror operator control element for a mirror face of a conventional exterior mirror disposed at a location proximate to the door, separately within the motor vehicle from the first operator control element, wherein the second operator control element is movable in at least two directions of movement that are perpendicular to one another to control tilting of the exterior camera in two perpendicular directions and/or to control displacement of the image detail in two perpendicular directions, and the second operator control element changes the orientation of the exterior camera by controlling the exterior camera to swivel independent of movement of the electronic side rearview simulated mirror.

16. The motor vehicle as claimed in claim 15, wherein the side rearview simulated mirror is an interior side mirror provided on an A-pillar of the motor vehicle.

17. The motor vehicle as claimed in claim 15, wherein a single camera is used to record the images displayed by the display apparatus.

* * * * *